US011175221B2

United States Patent
Acher et al.

(10) Patent No.: US 11,175,221 B2
(45) Date of Patent: Nov. 16, 2021

(54) INSTANTANEOUS ELLIPSOMETER OR SCATTEROMETER AND ASSOCIATED MEASURING METHOD

(71) Applicant: HORIBA FRANCE SAS, Palaiseau (FR)

(72) Inventors: Olivier Acher, Gif sur Yvette (FR);
Alexander Podzorov, Otsu (JP);
Thanh-Liem Nguyen, Massy (FR);
Brice Villier, Massy (FR); Géraldine Melizzi, Bures sur Yvette (FR);
Jean-Paul Gaston, Vert le Grand (FR)

(73) Assignee: HORIBA FRANCE SAS, Palaiseau (FR)

( * ) Notice: Subject to any disclaimer, the term of this patent is extended or adjusted under 35 U.S.C. 154(b) by 0 days.

(21) Appl. No.: 16/980,806

(22) PCT Filed: Mar. 14, 2019

(86) PCT No.: PCT/FR2019/050577
§ 371 (c)(1),
(2) Date: Sep. 14, 2020

(87) PCT Pub. No.: WO2019/186018
PCT Pub. Date: Oct. 3, 2019

(65) Prior Publication Data
US 2021/0010928 A1    Jan. 14, 2021

(30) Foreign Application Priority Data
Mar. 15, 2018    (FR) ...................... 1852225

(51) Int. Cl.
*G01N 21/21* (2006.01)
*G02B 5/30* (2006.01)
*G02B 27/10* (2006.01)

(52) U.S. Cl.
CPC ......... *G01N 21/211* (2013.01); *G02B 5/3025* (2013.01); *G02B 27/1006* (2013.01); *G01N 2021/213* (2013.01)

(58) Field of Classification Search
CPC .......... G01N 21/211; G01N 2021/213; G01N 21/47; G01N 21/274; G02B 5/3025; G02B 27/1006
(Continued)

(56) References Cited

U.S. PATENT DOCUMENTS 4,668,860 A * 5/1987 Anthon ................. G01N 21/47
250/225
5,864,394 A * 1/1999 Jordan, III ........... G01R 31/308
356/237.2

(Continued)

FOREIGN PATENT DOCUMENTS

JP   H11-211654   8/1999
JP   3269107      3/2002
WO   2014/016528  1/2014

OTHER PUBLICATIONS

International Search Report for PCT/FR2019/050577 dated Sep. 5, 2019, 6 pages, with English Translation.
(Continued)

*Primary Examiner* — Roy M Punnoose
(74) *Attorney, Agent, or Firm* — Nixon & Vanderhye

(57) ABSTRACT

Disclosed is an ellipsometer or scatterometer including a light source, a polarizer, an optical illumination system suitable for directing an incident polarized light beam towards a sample, a wavefront-division optical beam splitter arranged to receive a secondary light beam produced by reflection, transmission or diffraction, the wavefront-division optical beam splitter being oriented to form three collimated split beams, an optical polarization modification device and an optical polarization splitting device to form
(Continued)

Figure 5:
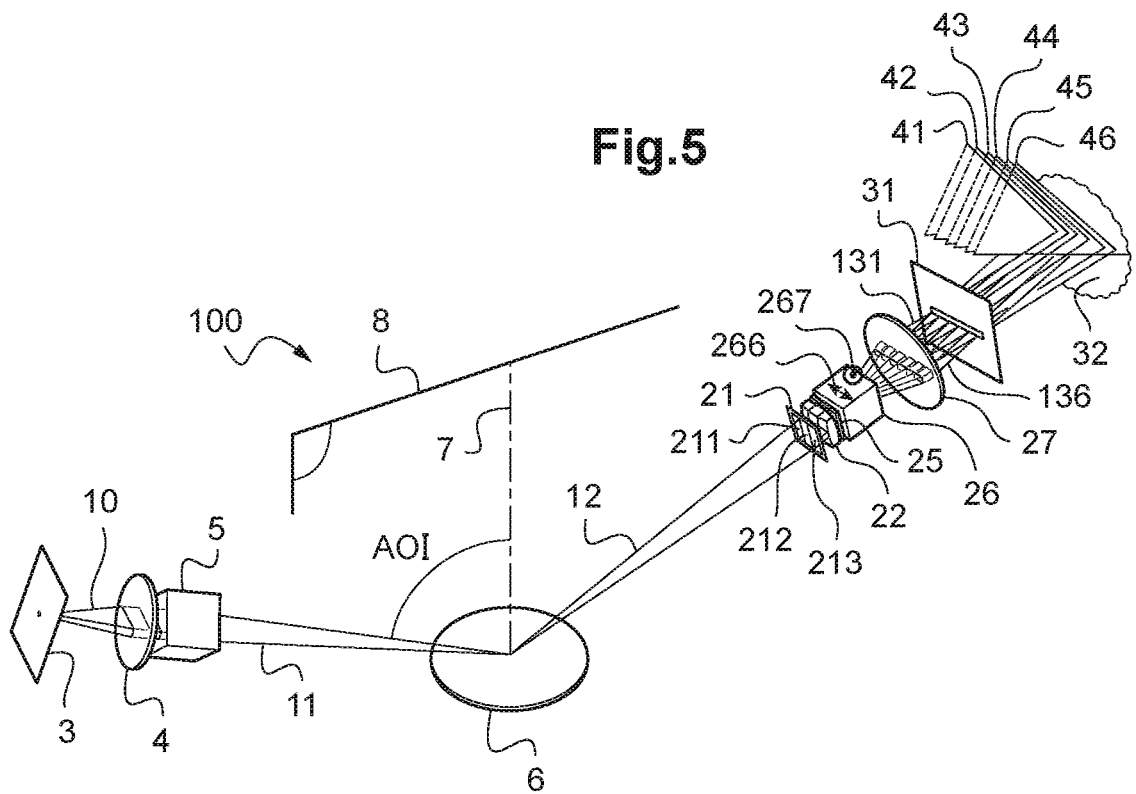

six angularly split beams, a detection system suitable for detecting the six split beams, and a processing system suitable for deducing therefrom an ellipsometric or scatterometric measurement.

20 Claims, 4 Drawing Sheets

(58) Field of Classification Search
USPC .......................................................... 356/364
See application file for complete search history.

(56) References Cited

U.S. PATENT DOCUMENTS

| | | | |
|---|---|---|---|
| 6,134,011 A * | 10/2000 | Klein | ................ G01J 4/04 250/225 |
| 6,384,916 B1 * | 5/2002 | Furtak | ................ G01J 3/447 356/369 |
| 7,684,032 B1 * | 3/2010 | Meeks | ................ H01L 22/12 356/237.2 |
| 2002/0163634 A1 * | 11/2002 | Meeks | ................ G01B 11/306 356/73 |
| 2010/0110427 A1 | 5/2010 | Amary et al. | |
| 2013/0010295 A1 | 1/2013 | Davidson et al. | |
| 2015/0204724 A1 | 7/2015 | Acher et al. | |
| 2017/0045397 A1 | 2/2017 | Schmidt et al. | |

OTHER PUBLICATIONS

Written Opinion of the ISA for PCT/FR2019/050577 dated Sep. 5, 2019, 7 pages.

* cited by examiner

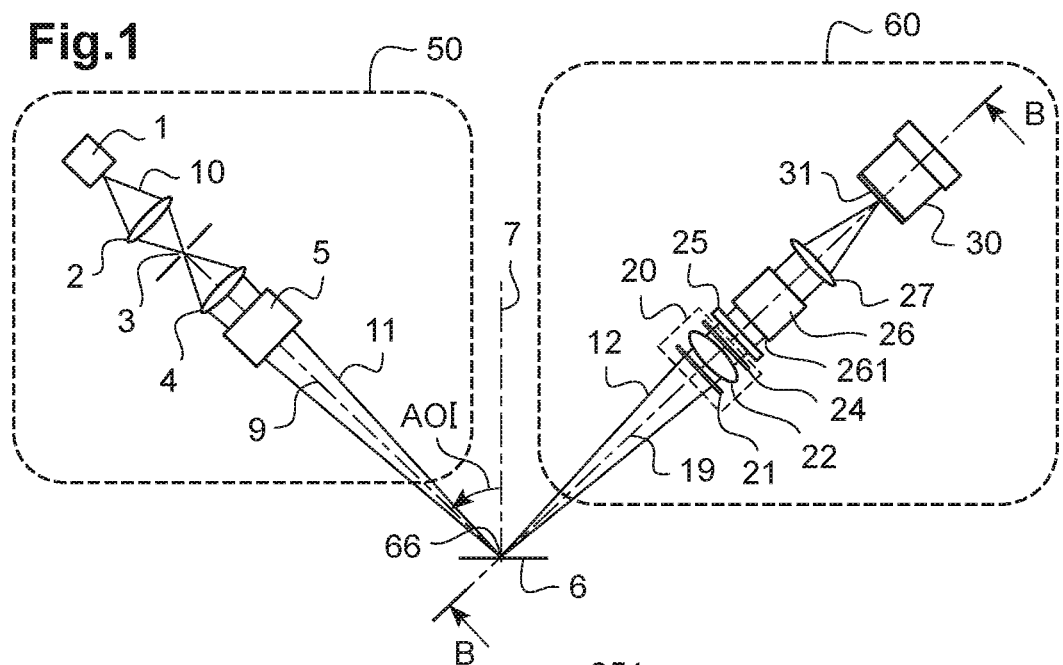
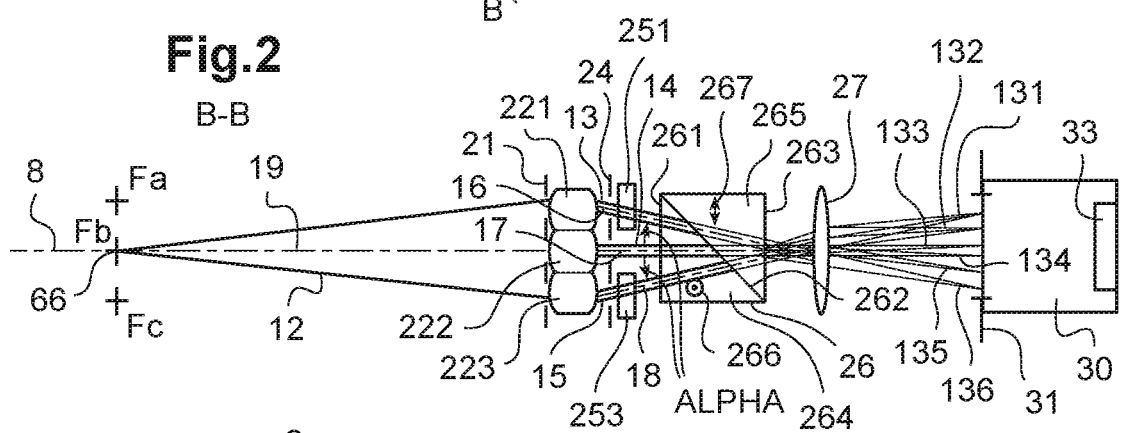
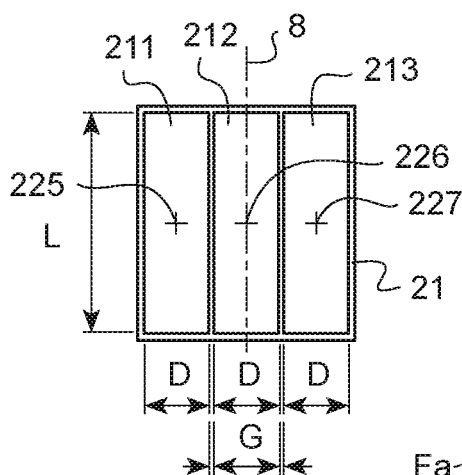
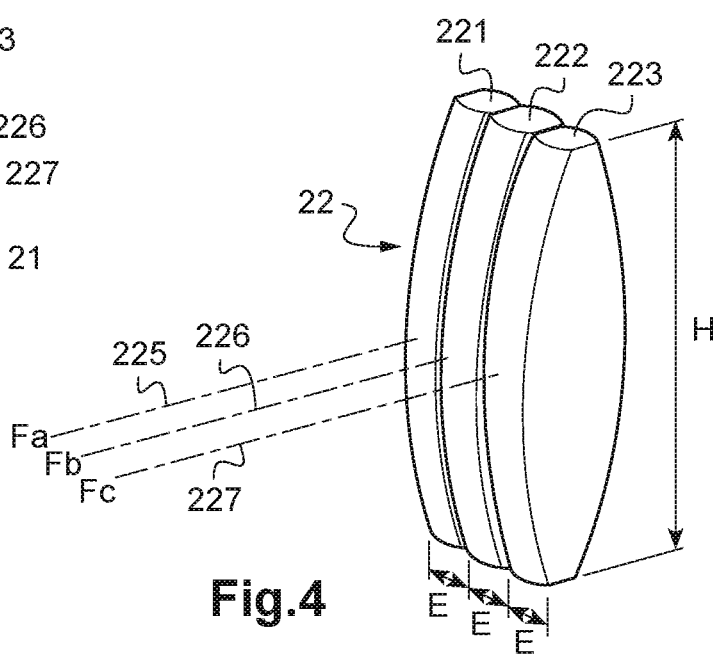

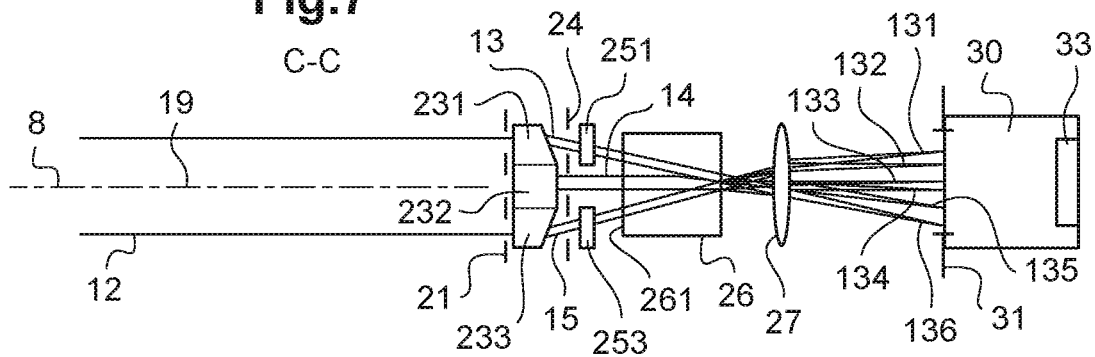
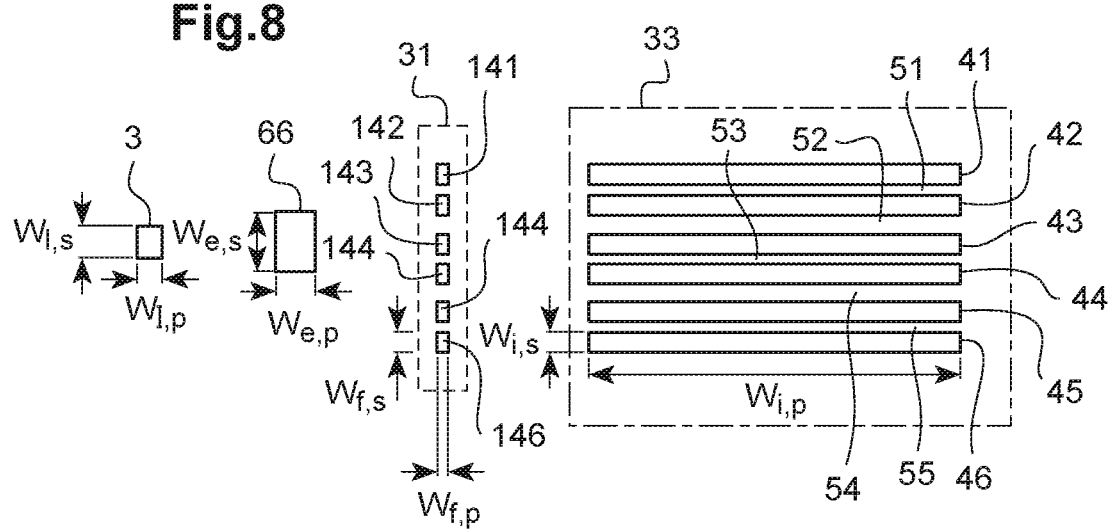
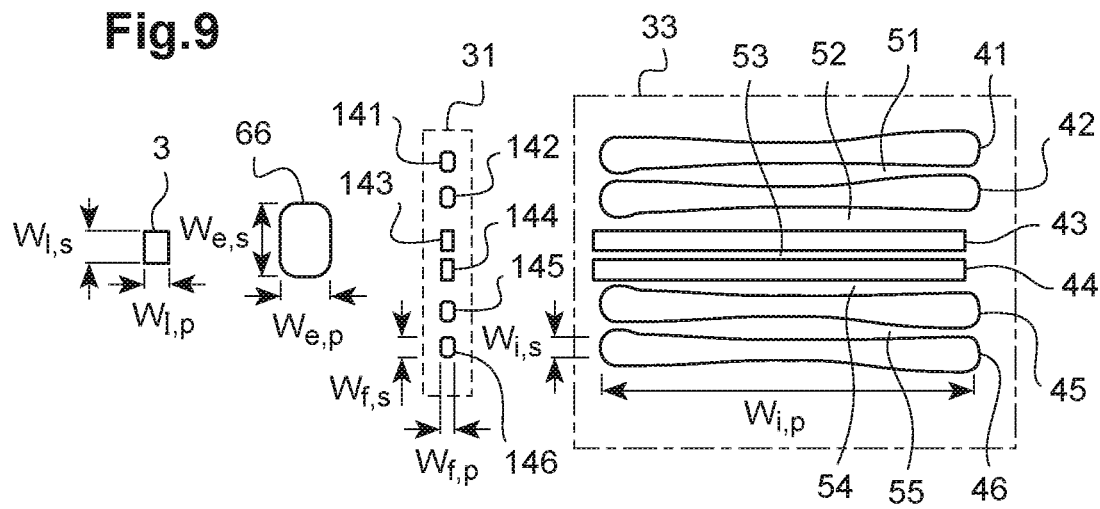

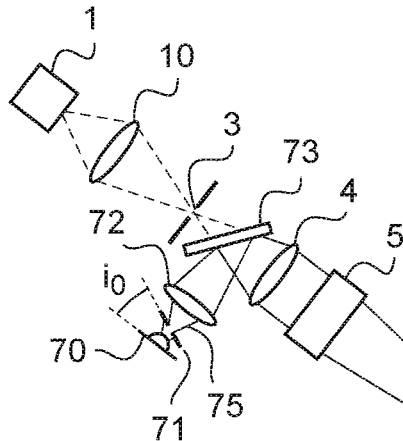
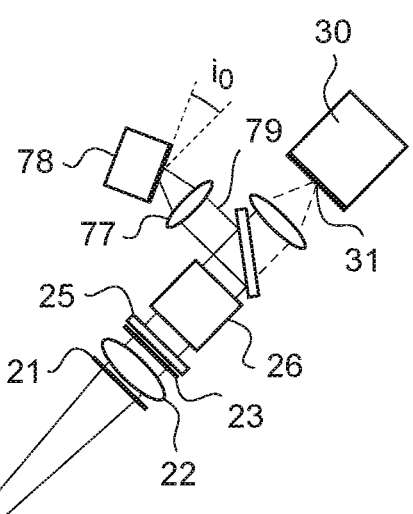
Fig.10
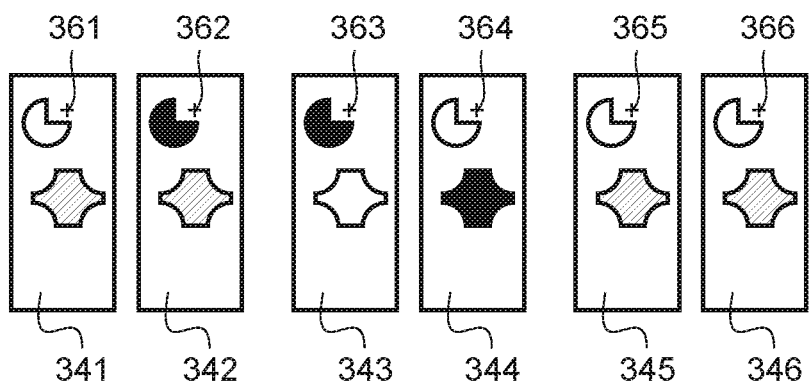
Fig.11
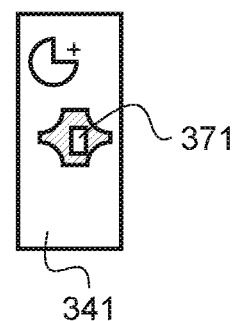
Fig.12

INSTANTANEOUS ELLIPSOMETER OR SCATTEROMETER AND ASSOCIATED MEASURING METHOD

CROSS-REFERENCE TO RELATED APPLICATIONS

This application is the U.S. national phase of International Application No. PCT/FR2019/050577 filed Mar. 14, 2019 which designated the U.S. and claims priority to French Application No. 1852225 filed Mar. 15, 2018, the entire contents of each of which are hereby incorporated by reference.

TECHNICAL FIELD TO WHICH THE INVENTION RELATES

The present invention generally relates to the field of optical instruments for measuring materials and/or thin layers.

More particularly, it relates to a spectroscopic or monochromatic ellipsometer or scatterometer and a spectroscopic or monochromatic ellipsometry or scatterometry method.

It more particularly relates to a spectroscopic or monochromatic ellipsometer or scatterometer with a very high measurement rate.

TECHNOLOGICAL BACK-GROUND

A spectroscopic ellipsometer or scatterometer generally includes an illumination arm and a detection arm. The illumination arm comprises a wide spectral band light source and a polarizer configured to polarize a light beam incident on a sample with a determined angle of incidence (AOI). The detection arm receives a light beam formed by reflection or transmission, for an ellipsometer, and by diffraction for a scatterometer, of the beam incident on the sample, and comprises a polarization analyser and a spectrometer to detect the reflected, transmitted or diffracted beam as a function of the wavelength.

A monochromatic ellipsometer or scatterometer includes the same elements, the light source being generally monochromatic and a detector receiving the reflected, transmitted or diffracted beam downstream from the polarization analyser without requiring a spectrometer.

In an ellipsometer operating in reflection on the sample, the detection arm is arranged so as to receive the reflected beam in the plane of incidence that forms an angle opposed to the angle of incidence with respect to the normal to the sample. In an ellipsometer operating in transmission, the detection arm is arranged so as to receive the beam transmitted by the sample in the plane of incidence.

In a scatterometer, the detection arm is arranged so as to receive a beam diffracted by the sample in the plane of incidence and that forms an angle generally different from the angle of incidence with respect to the normal to the sample.

There exist many monochromatic or spectroscopic ellipsometers. Most of these ellipsometers include an optical polarization modulator to temporally modulate the state of polarization of the beam incident on or reflected by the sample, in order to acquire the polarization components of the beam reflected or transmitted by the sample according to at least two independent states of polarization.

Monochromatic or spectroscopic ellipsometers are known, which are based on a rotating polarizer or a rotating compensator, an optical phase modulator or also a birefringent liquid crystal system that make it possible to vary the polarization of the light beam as a function of time. Whatever the type of optical polarization modulator, a detection system is used to acquire a series of measurements or spectra as a function of time, i.e. as a function of the polarization modulation. A spectrometer generally includes a photodetector consisted of an array or matrix of pixels that measures the intensity of the light beam, each pixel or each column of pixels being associated with a wavelength. In these conditions, the determination of the parameters searched in ellipsometry is performed by analysis of a series of monochromatic measurements or measurements of intensity spectrum l(lambda) as a function of time, over at least one period of modulation. Many publications have described different manners to deduce the ellipsometric quantities from a series of monochromatic or spectrum l(lambda) measurements determined for different positions of the component(s) modulating the polarization. The analysis of a series of monochromatic or spectrum l(lambda) measurements may be made in the frequency domain or in the time domain.

This approach, based on a temporal polarization modulation, however suffers from a certain number of drawbacks. Firstly, the measurement accuracy is affected by the intensity instabilities of the light source used. Moreover, the minimum duration of a measurement is fixed by the polarization modulation period and cannot be lower than half the modulation period. In particular, the use of an optical polarization modulator based on a rotating component may have drawbacks in terms of generation of vibrations but also in terms of long-term reliability and robustness. Finally, during the acquisition a series of spectra over a modulation period, it is generally not possible to adjust the time of acquisition of a spectrum as a function of the intensity thereof, because the duration of acquisition of a spectrum is determined by the modulation period. Hence, this approach does not make it possible to use the detector in a favourable intensity range of its dynamics for measuring each spectrum, avoiding the saturation while also avoiding a too low signal. That way, it is sometimes difficult to examine with a same monochromatic or spectroscopic ellipsometer materials having very different reflectivity values or to use spots having very different sizes.

On the other hand, it is known from the patent document WO 2014/016528 A1 a wavefront-division spectropolarimeter that makes it possible to split a source light beam into six polarized light beams and to measure simultaneously the intensity of the six spectral images corresponding to six polarized beams to deduce therefrom a spectroscopic measurement of the state of polarization of the source light beam. However, a wavefront-division polarimeter has for drawback that the light intensity distribution on the different spectral images strongly depends on the experimental conditions. Hence, the measured values of the light intensities of each of the images depend not only on the state of polarization, but also on the light intensity distribution at the place where the wavefront division is performed. The state of polarization measurement by means of such a polarimeter may be inaccurate and/or erroneous. Moreover, this document does not describe an ellipsometer or a scatterometer that requires analysing the state of polarization of a light beam reflected, transmitted or diffracted by a sample with well-defined angle of incidence and angle of reflection, transmission or diffraction.

Generally, in an ellipsometer or a scatterometer, to avoid introducing systematic measurement errors, it is desirable to avoid the insertion of any optical system liable to change the polarization of the light beam, on the one hand, between the polarizer of the illumination arm and the sample, and on the other hand, between the sample and the polarization analyser of the detection arm. Moreover, the insertion of the optical system is liable to reduce the light intensity of the beam, to limit the spectral band and/or to change the divergence of the light beam.

Finally, it is desirable to acquire monochromatic or spectroscopic ellipsometry or scatterometry measurements at a rate liable to exceed 50 Hz.

In certain applications, it desired to acquire monochromatic or spectroscopic ellipsometry measurements resolved as a function of time, for example for the monitoring in situ of thin layer growing, deposition or etching processes.

In these applications, it is desirable to avoid the use of rotating optical components due to the mechanical vibrations induced by the rotation.

On the other hand, it is desirable to extend the spectral domain of the ellipsometry or scatterometry measurements while maintaining or improving the quality of these measurements.

OBJECT OF THE INVENTION

In order to remedy the above-mentioned drawbacks of the state of the art, the present invention proposes an ellipsometer or scatterometer.

More particularly, it is proposed according to the invention an ellipsometer comprising a light source adapted to generate a source light beam, a polarizer adapted to receive the source light beam and to form a polarized incident light beam, an illumination optical system adapted to direct the polarized incident light beam towards a sample along an incident optical axis in a plane of incidence, an optical wavefront-division beam splitter arranged so as to receive a secondary light beam formed by reflection or transmission of the polarized incident light beam on the sample at a determined angle of incidence, the secondary light beam propagating along a secondary optical axis in the plane of incidence, the optical wavefront-division beam splitter being directed so as to form three collimated split beams propagating along three distinct optical axes angularly separated in a plane transverse to the plane of incidence and an optical polarization-changing device adapted to receive the three collimated split beams and to form three beams polarized according to three distinct states of polarization, an optical polarization-splitter device arranged and directed so as to receive the three beams polarized according to three distinct states of polarization and to form six separated beams propagating along six optical axes angularly separated in the plane transverse to the plane of incidence, a detection system adapted to detect the six separated beams and a processing system adapted to deduce therefrom an ellipsometry measurement.

The ellipsometer makes it possible to acquire an instantaneous ellipsometry measurement without modulation of the polarization. The duration of acquisition of an ellipsometry measurement may be easily adapted as a function of the intensity of each of the six detected beams.

According to a particular aspect, the ellipsometer is monochromatic.

According to another particular aspect, the detection system comprises at least one spectrometer adapted to detect the six separated beams.

According to a particular embodiment, the ellipsometer comprises an optical focusing system arranged to receive the six separated beams and to form six images aligned with each other and spatially separated from each other, and said at least one spectrometer comprises an imaging spectrometer comprising an entrance slit elongated along one direction and arranged so as to receive simultaneously the six images, the imaging spectrometer being adapted to spectrally disperse the six images and to form simultaneously six spectral sub-images spatially-separated on an image detector, the image detector being adapted to acquire an image of the six spectral sub-images and the processing system being adapted to process the image of the six spectral sub-images and to deduce therefrom a spectroscopic ellipsometry measurement.

The duration of acquisition of a spectroscopic measurement can be easily adapted as a function of the intensity of the spectral sub-images detected.

According to a first embodiment, the optical illumination system is adapted to focus the polarized incident light beam on the sample and the optical wavefront-division beam splitter includes a segmented lens including three lens segments having a same focal length and optical axes parallel to each other and spatially separated from each other, each lens segment having an object focal point, the thee lens segments being assembled so that said three object focal points are aligned on the sample transversally to the plane of incidence, each lens segment being arranged so as to receive a distinct portion of the secondary beam and to form a collimated split beam, the three lens segments being assembled so that said three split beams propagate along the three distinct optical axes.

According to a second embodiment, the optical illumination system is adapted to collimate the polarized incident light beam on the sample and the optical wavefront-division beam splitter includes at least two prisms having their edges arranged parallel to the plane of incidence, each prism being arranged so as to receive a distinct portion of the secondary beam and to form a collimated split beam propagating along an optical axis angularly deviated with respect to the secondary optical axis, the at least two prisms being directed and assembled so that said three collimated split beams propagate along the three distinct optical axes.

Other non-limitative and advantageous characteristics of the ellipsometer or scatterometer according to the invention, taken individually or according to all the technically possible combinations, are the following:

the optical wavefront-division beam splitter further includes a mask including three spatially-separated apertures;

the optical polarization-changing device includes at least two wave plates, preferably achromatic, each wave plate having a distinct retardance, a wave plate being arranged on one of the three split beams and another wave plate being arranged on another one of the three split beams;

the optical polarization-splitter device includes a Wollaston prism, a Rochon prism, a Sénarmont prism or a diffractive wave plate;

the optical wavefront-division beam splitter is adapted to angularly separate the three split beams by an angle ALPHA between adjacent split beams and the optical polarization-splitter device is adapted to angularly separate the six separated beams by an angle BETA between adjacent separated beams, the angle BETA being comprised between 0.6*ALPHA/2 and 1.5*ALPHA/2;

the light source includes a halogen lamp, a xenon flash lamp, a supercontinuum laser source and/or a fibre optic laser and/or a pulse source;

the light source is a supercontinuum laser source and further includes a cylindrical lens arranged on the optical path of the secondary beam upstream from the entrance slit of the imaging spectrometer, the cylindrical lens being adapted and directed so as to enlarge the six images transversally to the elongated direction of the entrance slit.

Advantageously, the ellipsometer or scatterometer includes a first source diaphragm, the optical illumination system being adapted to form a first image of the first source diaphragm on the sample, and/or includes a second source diaphragm, the optical illumination system being adapted to form a second image of the second source diaphragm on the sample, the surface area ratio between the first source diaphragm and the second source diaphragm being higher than or equal to 10.

According to a particular and advantageous embodiment, the light source is adapted to generate a first series of N1 light pulses, where N1 is a natural integer, the image detector being adapted to acquire a first image of the six spectral sub-images of the first series of N1 light pulses without saturation of the image detector, the light source being adapted to generate a second series of N2 light pulses, where N2 is a natural integer, N2 being comprised between N1+1 and 25.N1, the image detector being adapted to acquire a second image of the second series of N2 light pulses with saturation of the image detector on a first portion of the six spectral sub-images and without saturation of the image detector on a second portion of the six spectral sub-images, and wherein the processing system is adapted to combine the first portion of the six spectral sub-images of the first image with the second portion of the six spectral sub-images of the second image to deduce therefrom the spectroscopic ellipsometry measurement.

In a particular and advantageous manner, at least two spectral sub-images are spatially separated from each other by an intermediate area and the image processing system is adapted to measure a spurious light intensity in the intermediate area and to subtract said spurious light intensity from at least a portion of the image of the six spectral sub-images.

According to a particular aspect, the ellipsometer further includes a system for moving a sample-holder, the light source being adapted to generate a series of light pulses, the detection system being adapted to acquire a series of acquisitions of the six separated beams corresponding to the series of light pulses during a displacement of the sample-holder, and the processing system is adapted to process the series of acquisitions and to deduce therefrom a series of ellipsometry measurements as a function of the sample-holder displacement.

According to another particular aspect, the ellipsometer or scatterometer includes an auxiliary light source adapted to illuminate a surface of the sample and/or an auxiliary camera adapted to acquire at least one image of the sample.

The invention also proposes an ellipsometry measurement method comprising the following steps:

generating a polarized incident light beam;

directing the polarized incident light beam towards a sample along an incident optical axis in a plane of incidence;

receiving a secondary beam formed by reflection or transmission of the polarized incident light beam on the sample at a determined angle of incidence, the secondary beam propagating along a secondary optical axis in the incidence plane, optically splitting the secondary beam by wavefront division, so as to form three collimated split beams propagating along three distinct optical axes, the three distinct optical axes being angularly separated in a plane transverse to the plane of incidence, changing the polarization of at least two of the three collimated split beams so as to form three beams polarized according to three distinct states of polarization;

polarization-splitting the three polarized beams so as to form six separated beams propagating along six optical axes angularly separated in a plane transverse to the plane of incidence;

detecting the six separated beams to deduce therefrom an ellipsometry measurement.

According to a particular aspect, the method includes the following additional steps:

simultaneously focusing the six separated beams into six aligned and spatially separated images to an entrance slit of a spectrometer;

spectrally scattering the six images to form simultaneously six spectral sub-images spatially separated on an image detector;

acquiring an image of the six spectral sub-images; and processing the image of the six spectral sub-images to deduce therefrom a spectroscopic ellipsometry or scatterometry measurement.

The invention also relates to a scatterometer comprising a light source adapted to generate a source light beam, a polarizer adapted to receive the source light beam and to form a polarized incident light beam, an optical illumination system adapted to direct the polarized incident light beam towards a sample along an incident optical axis in a plane of incidence, an optical wavefront-division beam splitter arranged so as to receive a secondary light beam formed by diffraction of the polarized incident light beam on the sample at a determined angle of incidence, the secondary light beam propagating along a secondary optical axis in the plane of incidence, the optical wavefront-division beam splitter being directed so as to form three collimated split beams propagating along three distinct optical axes angularly separated in a plane transverse to the plane of incidence, an optical polarization-changing device adapted to receive the three collimated split beams and to form three beams polarized according to three distinct states of polarization, an optical polarization-splitter device arranged and directed so as to receive the three beams polarized according to three distinct states of polarization and to form six separated beams propagating along six angularly separated optical axes in the plane transverse to the plane of incidence, and a detection system adapted to detect the six separated beams and a processing system to extract therefrom a scatterometry measurement.

According to a particular embodiment, the scatterometer comprises an optical focusing system arranged so as to receive the six separated beams and to form six aligned and spatially separated images, and an imaging spectrometer comprising an entrance slit elongated along one direction and arranged so as to receive simultaneously the six images, the imaging spectrometer being adapted to spectrally scatter the six images and to form simultaneously six spectral sub-images spatially separated on an image detector, the image detector being adapted to acquire an image of the six spectral sub-images and the processing system being adapted to process the image of the six spectral sub-images and to deduce therefrom a spectroscopic scatterometry measurement.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 6:
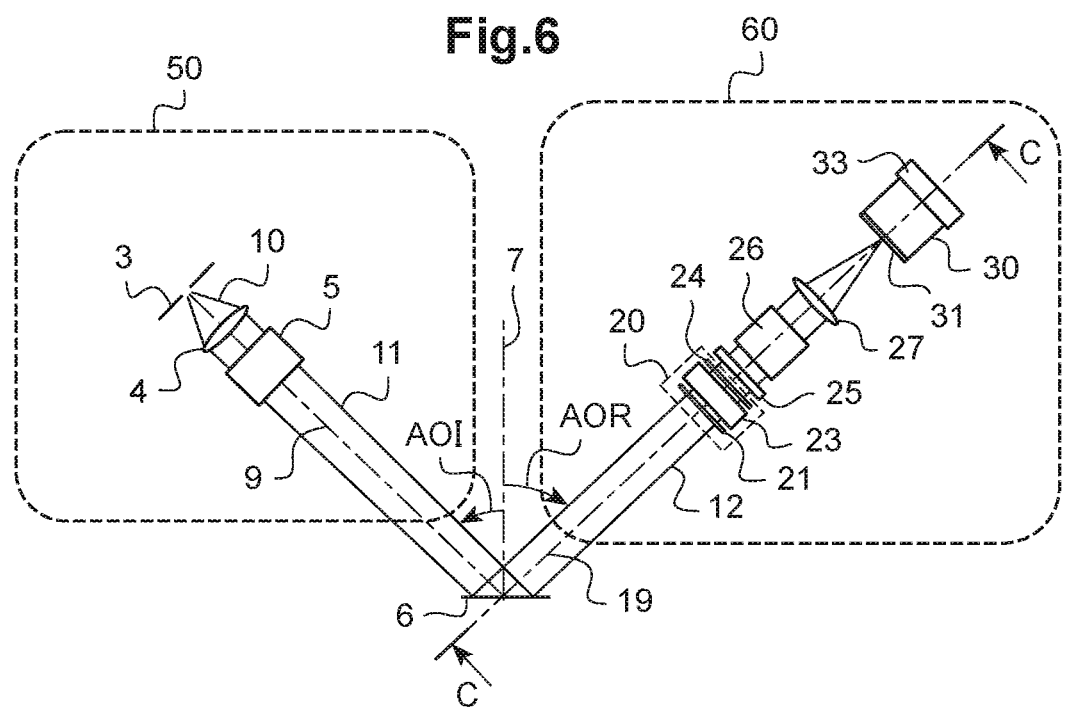

In the appended drawings:

FIG. 1 schematically shows a cross-sectional view of an ellipsometer or scatterometer according to a first embodiment, in configuration of incident beam focused on the sample;

FIG. 2 schematically shows a view according to a section BB of the detection arm of the ellipsometer or scatterometer illustrated in FIG. 1;

FIG. 3 schematically shows a front view of a first mask of the optical wavefront-division beam splitter;

FIG. 4 schematically shows a perspective view of a segmented lens used in the detection arm in FIGS. 1 and 2;

FIG. 5 schematically shows a 3D view of a spectrometric ellipsometer or scatterometer according to the first embodiment;

FIG. 6 schematically shows a cross-sectional view of an ellipsometer or scatterometer according to a second embodiment, in configuration of collimated incident beam;

FIG. 7 schematically shows a view according to a section CC of the detection arm of the ellipsometer or scatterometer illustrated in FIG. 6;

FIG. 8 schematically shows a spectropolarimetric image of a source diaphragm through a spectroscopic ellipsometer or scatterometer according to one of the embodiments without optical aberrations;

FIG. 9 schematically shows a spectropolarimetric image of a source diaphragm through a spectroscopic ellipsometer or scatterometer according to one of the embodiments, integrating optical aberrations;

FIG. 10 schematically shows a cross-sectional view of an ellipsometer or scatterometer with auxiliary light source and auxiliary visualisation;

FIG. 11 schematically shows an example of spectral sub-images used to form an image of PSI and an image of DELTA of a sample;

FIG. 12 illustrates an example of auxiliary visualization image with an ellipsometry spot in superimposition with an image of the sample.

Device and Method

In FIGS. 1 to 5 is shown an ellipsometer or scatterometer according to a first embodiment.

The ellipsometer or scatterometer includes an illumination arm 50 and a detection arm 60 arranged on either side of a sample 6 that is to be measured. The illumination arm 50 includes a light source 1, a first optical system 2, a source diaphragm 3, another optical focusing system 4 and a polarizer 5. Preferably, the polarizer 5 is arranged downstream from the optical focusing system 4. As an alternative, the polarizer 5 can be arranged upstream from the optical focusing system 4 or between different components of the optical focusing system 4.

The light source 1 emits a source light beam 10, preferably in a spectrally extended wavelength range, for example from 360 nm to 700 nm for a xenon flash lamp. The first optical system 2 forms the image of the source on the source diaphragm 3. As an alternative, a fibred light source whose end forms the source diaphragm 3 is used. The light source 1 can be a source emitting a light radiation that is continuous as a function of time or pulsed as described hereinafter. The light source 1 comprises for example a halogen lamp, a xenon flash lamp, a supercontinuum laser source and/or a fibre optic laser. As a variant, the light source 1 emits a monochromatic source light beam 10.

The polarizer 5 receives the source light beam 10 and forms a polarized incident light beam 11. The optical focusing system 4 forms the image of the source diaphragm 3 on the sample 6 so that the polarized incident light beam 11 illuminates the sample 6 on a spatially limited area. The polarized incident light beam 11 propagates along an incident optical axis 9 towards the sample.

In the first embodiment, the polarized incident light beam 11 is a beam focused on the sample, in other words a convergent beam corresponding to a spherical wavefront.

The optical axis 9 of the polarized incident light beam 11 and the normal 7 to the sample define a plane of incidence 8 that is herein merged with the plane of FIG. 1. The polarizer 5 is for example a polarizer of the Rochon type whose polarization axis is directed at 45 degrees from the plane of incidence.

The source diaphragm 3 is arranged in a plane transverse to the incident optical axis 9 and includes an aperture inscribed in a rectangle having a dimension perpendicular to the plane of incidence, denoted Wl,s, and a dimension parallel to the plane of incidence, denoted Wl,p. By way of example, the source diaphragm 3 includes a rectangular aperture of dimensions Wl,s and Wl,p, placed in front of a lamp or on the image of the emissive region of a lamp.

The detection arm 60 analyses a secondary light beam 12 formed by reflection, transmission or diffraction of the polarized incident light beam 11 on the sample 6. When the secondary light beam 12 is reflected, respectively transmitted, by the sample 6, it is talked about a reflection ellipsometer, respectively transmission ellipsometer. When the secondary light beam 12 is diffracted on the sample 6, it is talked about a scatterometer.

The secondary light beam 12 propagates along a secondary optical axis 19 in the plane of incidence 8. In an ellipsometer, the angle between the secondary optical axis 19 and the normal 7 to the sample is equal in absolute value to the angle of incidence (AOI). In a scatterometer, the angle between the secondary optical axis 19 and the normal 7 to the sample is generally different from the angle of incidence.

In the first embodiment, the secondary light beam 12 is a divergent beam corresponding to a spherical wavefront.

FIG. 2 schematically shows the detection arm 60 according to the first embodiment in a sectional plane BB transverse to the plane of incidence 8 and that comprises the secondary optical axis 19. The detection arm 60 includes an optical wavefront-division beam splitter 20, an optical polarization-changing device 25, an optical polarization-splitter device 26, an optical focusing system 27 and a detection system. In the case of a spectroscopic ellipsometer or scatterometer, the detection system includes at least one spectrometer 30. In a particularly advantageous manner, the spectrometer 30 is of the imaging spectrometer type.

More precisely, in the first embodiment, the optical wavefront-division beam splitter 20 includes a first mask 21 and a segmented lens 22. Optionally, the optical wavefront-division beam splitter 20 includes a second mask 24 arranged between the segmented lens 22 and the optical polarization-splitter device 26.

FIG. 3 illustrates a face view of the first mask 21 including three apertures 211, 212, 213, spatially separated from each other and surrounded by opaque bars. The first mask 21 is for example formed in a thin black-nickel plate; the plate having a thickness comprised between 12 μm and 80 μm. The three apertures 211, 212, 213 are arranged in a plane transverse to the secondary optical axis 19. In the example shown, the central aperture 212 of the mask 21 is arranged in the plane of incidence 8, the lateral apertures 211 and 213 being arranged symmetrically with respect to the plane of incidence. Preferably, the three apertures 211, 212, 213 are rectangular in shape and arranged side by side, with a side parallel to the plane of incidence and the other side perpendicular to the plane of incidence. By way of example, the three apertures 211, 212, 213 have a width D transversely to the plane of incidence of 2 mm, a length L in the plane of incidence of 1.5 mm and a distance G between adjacent apertures of 0.5 mm. The distance G corresponds to the thickness of the opaque bars.

The apertures 211, 212, 213 of the mask 1 have a limited length L in order to delimit the angle of incidence of the secondary beam 12. As an alternative, at least another aperture diaphragm is arranged on the illumination arm and/or, respectively, on the detection arm to delimit the angle of incidence of the incident beam and/or, respectively, of the reflected, transmitted or diffracted beam. The segmented lens 22 is illustrated in FIG. 4. The segmented lens 22 is formed of an assembly of three lens segments 221, 222, 223 of same focal length. The three lens segments 221, 222, 223 can be taken from a same spherical lens or from three similar spherical lenses. The lens segments 221, 222, 223 are cut from an isotropic (non-birefringent) material and reassembled so as to avoid the formation of birefringence patterns liable to change the polarization of the beams.

The lens segments 221, 222, 223 are for example bonded. The cutting and reassembly of the lens segments must be made so that the junction surfaces between the sides are parallel to each other, and arranged parallel to the plane of incidence. The segmented lens 22 is a multifocal lens. The three-focal segmented lens used herein is not a particular variety of what is usually called a lens, but, on the contrary, a different and particular optical components.

Let Fa, respectively Fb, Fc, be the object focal point of the lens segment 221, respectively 222, 223, on the optical axis 225, respectively 226, 227. The segmented lens 22 is arranged so that the three optical axes 225, 226, 227 are parallel to each other and the three object focal points Fa, Fb and Fc are aligned along a direction transverse to the plane of incidence, at least one object focal point Fa, Fb, Fc being of the sample 6. For example, the optical axis of the central lens segment 222 is aligned with the optical axis 19 of the secondary beam 12 and the object focal point Fb is at the intersection of the secondary light beam 12 on the sample 6. In other words, the object focal point Fb is located on the spot 66 of the beam focused on the sample.

By way of non-limitative example, the three lens segments 221, 222, 223 have a focal length of 100 mm, a height H in the plane of incidence of 3 mm and a thickness E transversely to the plane of incidence of 2 mm.

The first mask 21 is preferably arranged near the front face of the segmented lens 22, so that the optical axis 225, respectively 226, 227, passes through the aperture 211, respectively 212, 213, of the first mask 21. Hence, the first mask 21 in combination with the segmented lens divides the wavefront of the secondary light beam 12 into three split light beams. The width D of the apertures 221, 222, 223 and the thickness G of the opaque bars of the first mask 21 are adapted as a function of the thickness E of the lens segments 221, 222, 223 so that each lens segment of the segmented lens 22 receives one and only one split beam. The lens segment 221, respectively 222, 223, collimates the split beam 13, respectively 14, 15. The lens segment 221 forms a first split beam 13 that is collimated and propagates along an optical axis inclined by an angle ALPHA with respect to the optical axis 19 of the secondary beam 12. The lens segment 222 forms a second split beam 14 that is collimated and propagates along the optical axis 19 of the secondary beam 12. The lens segment 223 forms a third split beam 15 that is collimated and propagates along an optical axis inclined, preferably symmetrically, by an angle −ALPHA with respect to the optical axis 19 of the secondary beam 12.

Hence, the three collimated split beams 13, 14, 15 propagate along three distinct optical axes 16, 17, 18. The three collimated split beams 13, 14, 15 each have a planar wavefront. The three distinct optical axes 16, 17, 18 are in the plane of FIG. 2, transverse to the plane of incidence. Any two adjacent beams out of the three collimated split beams 13, 14, 15 are angularly separated by an angle ALPHA at the exit of the optical wavefront-division beam splitter 20.

According to a variant of the first embodiment, an optical system including a combination of a segmented lens and one or several conventional diverging or converging lenses is used to obtain an angular separation of the secondary beam into at least three beams.

Optionally, a three-aperture second mask 24 similar to the mask 21 is arranged to block the spurious scatterings in the segmented lens 22. The second mask 24 has a structure similar to that of the first mask 21, with three apertures separated by opaque bars having the same direction as the first mask 21.

The optical polarization-changing device 25 is placed between the segmented lens 22 and the optical polarization-splitter device 26. The optical polarization-changing device 25 includes at least two birefringent wave plates 251, 253 each introducing a different retardance. In the example illustrated in FIG. 2, a birefringent wave plate 251 is inserted on the optical path of the first collimated beam 13 and another birefringent wave plate 253 is inserted on the optical path of the third collimated split beam 15. In this example, no wave plate is arranged on the path of the second collimated split beam 14. By way of example, the wave plate 251 is an achromatic half-wave plate having its axis directed at about 22.5 degrees from the plane of incidence and the other wave plate 253 is an achromatic quarter-wave plate having its axis directed in the plane of incidence. The wave plates 251, 253 do not change the optical axis of propagation of the collimated split beams 13, 15, but only the polarization of the collimated split beams 13, 15. Moreover, the wave plates 251, 253 introduce a retardance that is constant as a function of time. The wave plates 251, 253 hence do not introduce a polarization modulation as a function of time.

At the exit of the optical polarization-changing device 25, three beams are hence obtained, which are collimated and polarized according to three distinct polarization states propagating along three optical axes 16, 17, 18 in a plane transverse to the plane of incidence.

The optical polarization-splitter device herein includes a Wollaston prism 26. The Wollaston prism 26 is placed downstream from the optical polarization-changing device 25. The entrance face 261 of the Wollaston prism 26 is transverse to and centred on the optical axis of the second collimated split beam 14. So arranged, the Wollaston prism 26 intercepts the first, second and third collimated split light beams 13, 14, 15, polarized according to three distinct states of polarization incident on the entrance face 261 thereof.

The Wollaston prism 26 is herein formed of two right prisms 264, 265 placed side by side at a planar splitting interface 262. The Wollaston prism polarization-splits each incident beam 13, 14, 15 according to a splitting plane perpendicular to the plane of incidence. The plane of FIG. 2 corresponds to the splitting plane. The separation angle between two polarization-split beams at the exit of the Wollaston prism 26, coming from a same collimated incident beam, is denoted BETA. The Wollaston prism 26 is chosen so that the angle BETA is comprised between 0.6*ALPHA/2 and 1.5*ALPHA/2. Preferably, BETA is chosen equal to ALPHA/2. For example, the angle BETA is equal to 2.65 degrees for the wavelength 589 nm. The Wollaston prism can for example be formed of two prisms made of quartz, of barium borate, of calcite crystal, with a separation angle BETA of 2.65 degrees, or made of magnesium fluoride with a separation angle of 0.75 degrees.

According to a first type of Wollaston prism, the polarization of the separated beams is respectively parallel and perpendicular to the splitting plane. It is herein preferred to use another type of Wollaston, in which the polarizations of the two beams coming from the polarization splitting are at ±45 degrees from the splitting plane. The reason for this recommendation to polarization-split the beams at +45 degrees or −45 degrees from the splitting plane is the following: it is known that a diffraction-grating spectrometer has an efficiency that depends on the polarization. In the case of a Wollaston prism according to the first type, the polarization of the beams separated by the polarimetric stage is then parallel or perpendicular to the lines of the grating, according to the beam considered. Two beams of identical intensity and different polarizations then produce different signals on the image sensor of the imaging spectrometer, due to this different efficiency according to the polarization. On the contrary, by separating the polarization of the beams at +45 degrees or −45 degrees from the splitting plane, the beams of different polarizations are diffracted with the same efficiency by the diffraction grating, and that independently of their polarization $I_{i,+}$ or $I_{i,-}$ where the index i=1, 2, 3 denotes one of the beams 13, 14, 15 split by the optical wavefront-division beam splitter, the index + represents the component at +45 degrees and the index − represents the component at −45 degrees, separated by the Wollaston prism. This property is useful in order to obtain ellipsometry or scatterometry values of the form $\delta_i = (I_{i,+} - I_{i,-})/(I_{i,+} + I_{i,-})$ that are not affected by an error linked to the difference of efficiency of the grating network as a function of the polarization. When it is possible to correct the response of the different paths by means of a suitable calibration, this recommended configuration makes it possible either not to perform this calibration, or, if nevertheless performed, to have calibration coefficients that are less sensitive to error causes such as the dependence of these coefficients to wavelength.

In the example illustrated in FIG. 2, according to the first type of Wollaston prism, the optical axis of the first right prism 264 is parallel to the plane of incidence 8 and perpendicular to the three optical axes 16, 17, 18 of the three split light beams 13, 14, 15 and the optical axis of the second right prism 265 is perpendicular to the plane of incidence 8.

So directed, the Wollaston prism 26 generates, from the first collimated split light beam 13 incident on the splitting interface 262, two polarized light beams 131, 132 emerging through the exit face 263 of the Wollaston prism 26.

The two polarized light beams 131, 132 are polarized according to two states of polarization orthogonal to each other, preferably at ±45 degrees. The two polarized light beams 131, 132 propagate along two directions of propagation angularly separated by the separation angle BETA of the Wollaston prism, herein 2.65 degrees. The two polarized light beams 131, 132 are collimated.

In the same way, the Wollaston prism 26 generates, from the second split light beam 14 and the third split light beam 15, respectively, each incident on the splitting interface 262, two polarized light beams 133, 134 and two polarized light beams 135, 136, emerging through the exit face 265 of the Wollaston prism 26.

The two polarized light beams 133, 134 (respectively, two polarized light beams 135, 136) are polarized according to two polarizations perpendicular to each other and propagate along two different directions of propagation separated by the separation angle BETA of the Wollaston prism 26.

Hence, the Wollaston prism 26 generates in total six polarized light beams 131, 132, 133, 134, 135, 136.

The separation angle of the Wollaston prism 26 is such that the six polarized light beams 131, 132, 133, 134, 135, 136 are angularly separated from each other while propagating in a plane transverse to the plane of incidence 8 (see in FIG. 5 in perspective view). Advantageously, when BETA=ALPHA/2, any two adjacent beams out of the six polarized light beams 131, 132, 133, 134, 135, 136 are angularly separated by the angle BETA at the exit of the Wollaston prism 26.

As a variant, instead of a Wollaston prism, the polarization-splitting means 26 may for example comprise a Rochon prism, a Sénarmont prism or a diffractive wave plate.

Advantageously, the optical focusing system 27 is placed at the exit of the Wollaston prism 26. The optical focusing system 27 includes for example a lens having a focal length of 10 mm. The optical focusing system 27 receives the six collimated polarized light beams 131, 132, 133, 134, 135, 136 and focuses them into six images 141, 142, 143, 144, 145, 146 on a detection system. In an example, the detection system includes several independent detectors to acquire six intensity measurements corresponding to the six polarized light beams 131, 132, 133, 134, 135, 136. In another example, an imaging detector receives the six images 141, 142, 143, 144, 145, 146 and acquire six intensity measurements. In a particular example of spectroscopic ellipsometer or scatterometer, the six images 141, 142, 143, 144, 145, 146 are focused on the entrance slit 31 of an imaging spectrometer 30. The six images are spatially separated from each other while being aligned along a direction transverse to the plane of incidence 8.

According to a particular aspect of the present disclosure, the imaging spectrometer 30 is placed so that its entrance slit 31 is in the plane of the 6 images, created by the optical wavefront-division beam splitter 20, the Wollaston prism 26 and the optical focusing system 27. Preferably, the entrance slit 31 is of rectangular shape elongated along an axis parallel to the direction of alignment of the six images 141, 142, 143, 144, 145, 146, i.e. perpendicular to the plane of incidence 8.

An imaging spectrometer 30 is a known variety of spectrometer, which has an entrance slit 31, scattering and focusing means, and an image sensor 33. The image obtained represents a set of spectra corresponding to the light entering at different abscissa along the entrance slit 31. An example of imaging spectrometer is the spectrometer CP140, of the HORIBA Company, or the CP20, of this same company. These spectrometers are based on the use of concave diffraction gratings corrected from the chromatic aberrations, that ensure both the spectral scattering and the focusing of the spectra on the image sensor. There exist other imaging spectrometers, such as the Offner imaging spectrometers, that are also adapted for this use. The imaging spectrometer is arranged so that the spectral scattering direction is orthogonal to the axis of the entrance slit. In the case of a diffraction-grating imaging spectrometer, the lines of the diffraction grating 21 are preferably parallel to the entrance slit 31.

According to an aspect of the present disclosure illustrated in FIG. 8, the dimensions of the source diaphragm 3 and, more precisely, the dimension perpendicular to the plane of incidence Wl,s is small enough, taking into account the magnification of the optical systems 2, 4 of the illumination arm and of the optical systems 22 and 27 of the detection arm, so that the 6 images 141, 142, 143, 144, 145, 146 of the source diaphragm 3 are spatially separated from each other at the detection system by a distance higher than the height Wf,s. In particular, in the case of a spectroscopic ellipsometer or scatterometer including an imaging spectrometer, the 6 images 141, 142, 143, 144, 145, 146 of the source diaphragm 3 are spatially separated in the plane of the entrance slit 31 of the imaging spectrometer by a distance higher than the height Wf,s. In other words, the 6 images 141, 142, 143, 144, 145, 146 do not overlap each other in the plane of the detection system or of the entrance slit 31 of an imaging spectrometer 30. In an optional but recommended manner, the other dimension Wl,p of the source diaphragm 3 is small enough so that the other dimension Wf,p of each of the 6 images 141, 142, 143, 144, 145, 146 parallel to the plane of incidence is lower than the width of the entrance slit 31 of the imaging spectrometer 30. According to the present disclosure, the diffraction grating 32 of the imaging spectrometer 30 then produces on the image sensor 33 an image including 6 spectral sub-images (or more) of the secondary beam 12. These 6 spectral sub-images, denoted 41, 42, 43, 44, 45, 46, are spatially disjoint on the surface of the image sensor 33. Each spectral sub-image 4j corresponds to a spectrally spread image 14j.

The image sensor 33 has a detection surface suitable to record one image of the 6 spectral sub-images 41, 42, 43, 44, 45, 46. The image sensor 33 comprises for example a grey-level CMOS camera comprising n rows and m columns of pixels. For example, a black and white CMOS Sony camera comprising 1200×1920 pixels is used, and a surface area of about 400×1800 pixels is used for a faster reading. Each pixel has a surface area of 5.86×5.68 μm. Each spectral sub-image 4j (where j=1, . . . , 6) extends over at least one row of pixels. The CMOS camera is selected so as to have a high sink density, preferably a sink density higher than or equal to 800 electrons/μm². The image sensor 33 operates at an image acquisition rate of one Hertz, 50 Hz, 100 Hz or even higher than or equal to 200 Hz.

The ellipsometer or scatterometer also includes an image processing system, which is adapted to apply the following steps:

summing all the pixels of a same column of a spectral sub-image corresponding to a same wavelength, so as to obtain 6 (or more) intensity spectra;

calculating the ratios $\delta_i=(I_{i,+}-I_{i,-})/(I_{i,+}+I_{i,-})$ for each wavelength and each index i, where i=1, 2, 3, and wherein the index 1,+ corresponds to the spectral sub-image 41, the index 1,− corresponds to the spectral sub-image 42, the index 2,+ corresponds to the spectral sub-image 43, the index 2,− corresponds to the spectral sub-image 44, the index 3,+ corresponds to the spectral sub-image 45, the index 3,− corresponds to the spectral sub-image 46;

calculating the reduced Stokes vector, i.e. the Stokes vector divided by its first component, by multiplying the vector $(\delta_1, \delta_2, \delta_3)$ by a suitable matrix. This matrix will have been determined by calibration, by means of measurements on known states of polarization.

Similarly, a monochromatic ellipsometer or scatterometer also includes a processing system, which is adapted to apply the following steps:

receiving the 6 intensity acquisitions corresponding to the 6 polarized beams 131, 132, 133, 134, 135, 136;

calculating the intensity ratios $\delta_i=(I_{i,+}-I_{i,-})/(I_{i,+}+I_{i,-})$ for each index i, where i=1, 2, 3, and wherein the index 1,+ corresponds to the polarized beam 131, the index 1,− to the polarized beam 132, the index 2, + to the polarized beam 133, the index 2,− to the polarized beam 134, the index 3,+ to the polarized beam 135, the index 3,− to the polarized beam 136;

calculating the reduced Stockes vector, i.e. the Stokes vector divided by its first component, by multiplying the vector $(\delta_1, \delta_2, \delta_3)$ by a suitable matrix. This matrix will have been determined by calibration by means of measurements on known states of polarization.

The person skilled in the art then knows, from the measured Stockes vector and from the knowledge of the state of polarization of the incident light, how to determine the values Psi and Delta, which are commonly used in ellipsometry. A depolarization coefficient, as well as diffraction coefficients used in scatterometry, are also simultaneously determined.

An instantaneous monochromatic or spectroscopic ellipsometry or scatterometry measurement, i.e. based on a single acquisition on the detection system, for example on the acquisition of a single image on an image detector, without polarization modulation and without inducing vibration by rotation of optical component, are hence obtained. The acquisition rate is limited by the reading rate of the image sensor. Monochromatic or spectroscopic ellipsometry or scatterometry measurements can hence be performed over a wide spectral band, at a rate of one to several tens of Hertz or even higher than 100 Hz or 200 Hz.

FIGS. 6 and 7 show an ellipsometer or scatterometer according to a second embodiment. The same signs of reference denote components or systems similar to those of FIGS. 1 to 5.

Similarly to the first embodiment, the illumination arm 50 includes a source diaphragm 3, an optical system 4 and a polarizer 5. However, unlike the first embodiment, the optical system 4 of the illumination arm 50 is arranged so as to illuminate the sample 6 with a polarized incident light beam 11 that is collimated and not focused on the sample 6. In the second embodiment, the polarized incident light beam 11 is a beam collimated on the sample corresponding to a planar wavefront. Moreover, in the second embodiment, the secondary light beam 12 formed by reflection, transmission or diffraction of the polarized incident light beam 11 on the sample 6 is also a collimated beam corresponding to a planar wavefront.

FIG. 7 schematically shows the detection arm 60 according to the second embodiment in a sectional plane CC transverse to the plane of incidence 8 and that comprises the secondary optical axis 19.

In the second embodiment, the optical wavefront-division beam splitter 20 includes a first mask 21 and at least two prisms 231, 233. The first mask 21 is similar to that described in connection with FIG. 3. The first mask 21 splits the wavefront of the secondary light beam 12 into three split light beams that are herein collimated. Optionally, the optical wavefront-division beam splitter 20 includes a second mask 24 arranged between the prisms 231, 233 and the optical polarization-splitter device 26.

By way of example, the optical wavefront-division beam splitter 20 includes a first prism 231 arranged opposite the aperture 211 of the mask 21 and a second prism 233 arranged opposite the aperture 213 of the mask 21. Hence, each prism 231, respectively 233, receives one and only one split beam 13, respectively 15. Advantageously, no prism is arranged opposite an aperture 212 so as to let one of the three split light beams, in the example show the split beam 14, pass through without deviation. The prisms 231, 233 are preferably identical and directed so that their edges each extend along a direction parallel to the plane of incidence and perpendicular to the secondary optical axis 19. For example, a triangular or quadrangular cross-section prism made of silica, with an angle comprised between 1° and 8° between the entrance face and the exit face is used. Preferably, the prisms 231, 233 are a little spectrally dispersive. The prisms 231, 233 are preferably directed with their respective bases facing each other or their respective edges facing each other and separated by a distance equal to the distance between the apertures 211 and 213. Hence, the first prism 231 receives the split beam 13 and deviates it by an angle ALPHA with respect to the optical axis 19 of the secondary beam 12 in a plane transverse to the plane of incidence. Symmetrically, the second prism 233 receives the split beam 15 and deviates it by an angle –ALPHA with respect to the optical axis 19 of the secondary beam 12 in a plane transverse to the plane of incidence.

Hence, the three collimated split beams 13, 14, 15 propagate along three distinct optical axes 16, 17, 18. In the absence of prism on the optical path of the split beam 14, this beam is not deviated and the optical axis 17 is merged with the secondary optical axis 19. The three collimated split beams 13, 14, 15 each have a planar wavefront. The three distinct optical axes 16, 17, 18 are in the plane of FIG. 7 transverse to the plane of incidence. Advantageously, any two adjacent beams out of the three collimated split beams 13, 14, 15 are angularly separated by an angle ALPHA at the exit of the optical wavefront-division beam splitter 20.

According to a variant of the second embodiment, an optical system is used, which includes a combination of prisms and of one or several conventional converging lenses to obtain an angular separation of the secondary beam into at least three beams.

A optical polarization-changing device 25 is arranged so as to change the polarization of at least two of the three split beams to form three collimated beams polarized according to three distinct states of polarization propagating along the three optical axes 16, 17, 18 in a plane transverse to the plane of incidence. The polarization separator 26 of the second embodiment is similar to that of the first embodiment and operates similarly to form six polarized beams 131, 132, 133, 134, 135, 136 angularly separated from each other. The optical focusing system 27 and the imaging spectrometer 30 are similar to those described in connection with FIGS. 1, 2 and 7 of the first embodiment.

In the two embodiments described hereinabove, six spatially-separated polarized light beams are obtained on the detection system. Advantageously, in the case of a spectroscopic ellipsometer or scatterometer comprising an imaging spectrometer, the six polarized light beams form six images on the entrance slot of the imaging spectrometer 30.

FIG. 8 schematically shows a spectropolarimetric image of a source diaphragm through a spectroscopic ellipsometer or scatterometer and a reflective or transparent sample according to the configuration chosen. The source diaphragm 3 (in front view in FIG. 8) is inscribed in a rectangular aperture of dimensions Wl,s and Wl,p in a plane transverse to the incident optical axis 9. The optical system 4 of the illumination arm forms on the sample an image 66 of the source diaphragm 3 of dimensions We,s and We,p in the plane of the sample. The ratio between the dimensions We,s and Wl,s on the one hand and between the dimensions We,p and Wl,p on the other hand depends on the optical magnification of the optical system 4 and of the angle of incidence on the sample 6. In the plane of the entrance slot 31 of the imaging spectrometer 30, six images 141, 142, 143, 144, 145 and 146 are obtained, each having a rectangular shape in the absence of optical aberrations and of identical dimensions Wf,s and Wf,p. In the plane of the two-dimensional image sensor 33 of the imaging spectrometer 30, six spectral sub-images 41, 42, 43, 44, 45 and 46 are obtained, each having a rectangular shape in the absence of optical aberrations and of identical dimensions Wi,s by Wi,p. The six spectral sub-images 41, 42, 43, 44, 45 and 46 are spatially separated from each other by one or several rows of pixels. More precisely, the six spectral sub-images 41, 42, 43, 44, 45 and 46 are separated in the plane of the image sensor 33 by at least five intermediate areas respectively denoted 51, 52, 53, 54 and 55, in which the detected intensity is null or very low. By null or low, it is herein meant that, once the background signal subtracted, for each wavelength of interest, the value of the signal in the separation area is at least 10 times lower than the maximum value of the signal observed on pixels corresponding to this same wavelength, in any of the six spectral sub-images 41, 42, 43, 44, 45 and 46.

For the six images 141, 142, 143, 144, 145 and 146 to be separated in the plane of the entrance slot 31 of the imaging spectrometer, it is necessary that the dimension Wf,s is small enough with respect to the spacing between two adjacent images, for example 131 and 132, so that the images do not overlap each other. For that purpose, the angular separation between the 6 paths performed on the one hand by the optical wavefront-division beam splitter 20 and on the other hand by the optical polarization-splitter device 26 is high enough so that the 6 images 141, 142, 143, 144, 145 and 146 are spatially separated in the plane of the entrance slot 31. In the case where the different optical focusing and imaging systems 2, 4, 22, 27 are without aberrations, the person skilled in the art will adapt without particular difficulty the parameters of the optical wavefront-division beam splitter 20 and of the optical polarization-splitter device 26 as a function of the dimensions of the source diaphragm 3 and of the focal lengths of the optical systems of the illumination and of the detection arm, so that the 6 images of the source surface in the plane of the entrance slot 31 of the imaging spectrometer do not overlap each other.

However, the optical systems generally show geometric and/or chromatic optical aberrations. As illustrated in FIG. 9, the width Wi,s of each of the spectral sub-images 41, 42, 43, 44, 45 and 46 observed on the sensor of the imaging spectrometer is affected by aberrations, imperfections, and by the generation of spurious light coming from the optical focusing system 4 and/or 27, of the optical wavefront-division beam splitter 20, of the optical polarization-splitter device 26 and/or of the imaging spectrometer 30.

According to a particular aspect of the present disclosure, the intermediate areas 51, 52, 53, 54 and 55 in which the detected intensity is null or very low are advantageously used to ensure that there is no cross-talk between the 6 spectral sub-images associated with the 6 complementary polarization pieces of information. On the other hand, even in the absence of cross-talk, there still exists a certain level of spurious light. This spurious light corresponds to the fact that very illuminated areas of the image generate a spurious illumination that extends beyond the only very illuminated area. It is difficult to lower the level of spurious light under 0.5% in a compact spectrometer. Now, in an ellipsometer, a measurement accuracy better than 0.1% is generally required. It is then advantageous to be able to determine then subtract the spurious light. For that purpose, use is made of the fact that the spurious light is generally little focused, i.e. that the level of spurious light evolves slowly as a function of the spatial coordinates. The intermediate areas 51, 52, 53, 54 and 55 receive theoretically no signal. According to a particular aspect of the present disclosure, the signal is measured in one or several intermediate areas 51, 52, 53, 54 and/or 55 to estimate the level of spurious light on the neighbouring pixels. By neighbour pixels, it is herein meant pixels located in a rectangle of about ten to a few tens of pixels side. The measurements are corrected in the spectral sub-images 41, 42, 43, 44, 45 and 46, by subtracting from pixels of the paths corresponding to the searched signal, an estimated value of spurious light obtained for example by an average of the values of a certain number of adjacent pixels of the closest intermediate areas 51, 52, 53, 54 and 55, in other words in a rectangle of about ten to a few tens of pixels side, i.e. for neighbouring wavelengths.

As described hereinabove, the reduced Stokes vector is obtained from measurements of the six polarized light beams or of the six spectral sub-images 41, 42, 43, 44, 45 and 46 spatially separated and polarization split on the image detector. This measurement can be acquired at the acquisition rate of the detection system, for example 50 Hz 100 Hz. It is highlighted herein that no temporal polarization modulation is required.

According to a first exemplary embodiment, the illumination arm 50 includes a xenon flash lamp 1 having a power of 5 W, the first optical system 2 includes a lens that focuses an image of the arc of the xenon flash lamp 1 to a device carrying several source diaphragms, a first source diaphragm of size Wl,s=540 μm×Wl,p=250 μm, and a second source diaphragm of size Wl,s=50 μm×Wl,p=25 μm. The optical focusing system includes a lens 4 of focal length 50 mm, forming an image of the source diaphragm with a magnification factor of 1 on the sample 6 placed at 100 mm from the lens 4. A Rochon polarizer 5 is placed at the exit of this lens 4, the polarization axis thereof being directed at 45 degrees from the plane of incidence 8. The reception arm 60 includes a segmented lens 22, of focal length 100 mm. This segmented lens 22 is manufactured from a biconvex lens of focal length 100 mm, made of N-BK7, by cutting three segments 221, 222, 223 of width E≈1 mm and height H≈8 mm, as illustrated in FIG. 4, then assembling the three segments 221, 222, 223 by bonding. Placed on the optical path of the reflected secondary beam 12 at 100 mm from the sample, the segmented lens 22 creates 3 collimated beams 13, 14, 15 separated by an angle of about 1.8 degrees. The splitting plane is a plane normal to the plane of incidence containing the optical axis 19 of the secondary beam 12. A mask 21 having three apertures 211, 212, 213 is placed in front of the segmented lens 22, in order to effectively separate the 3 collimated beams 13, 14, 15, while avoiding that a portion of the secondary beam incident on the junction area between two adjacent segments enters through a lens segment and exits through another lens segment. Just after the segmented lens 22, a wave plate 251 is placed in front of a lens segment 221 and, respectively, another wave plate 253 is placed in front of another lens segment 223, so as to intercept exactly the collimated beams 13, respectively 15, each passing through one of these two lens segments 221, respectively 223. The wave plate 251 is for example an achromatic half-wave plate, having its axis directed at about 22.5 degrees from the plane of incidence. The wave plate 253 is for example an achromatic quarter-wave plate, having its axis directed in the plane of incidence. A Wollaston prism 26, separating a non-polarized beam by an angle BETA of 0.9 degrees, into 2 beams having polarizations at +45 and −45 degrees from the splitting plane, is placed on the path of all 3 collimated beams 13, 14, 15, with its splitting plane perpendicular to the plane of incidence. A lens 27 of focal length 10 mm is placed at the exit of the Wollaston prism 26 to focus the six separated beams 131, . . . , 136 to the entrance slit 31 of a spectrometer CP20 of HORIBA company. The large dimension of the entrance slit, 2 mm, is placed in the scattering plane of the 6 separated beams 131, . . . , 136. The small dimension of the entrance slit is of 25 μm. The image detector 33 equipping the spectrometer CP20 is a monochrome sensor SONY whose pixels are 5.86 μm side.

FIG. 8 schematically shows the image obtained by the sensor, as well as the different areas 41, . . . , 46 defined hereinabove and associated with the signal processing. The values of the intensities acquired on each of these areas 41, . . . , 46 make it possible to deduce therefrom the spectroscopic values of Psi an Delta of the sample.

The spectroscopic ellipsometer or scatterometer of the present disclosure makes it possible to adapt the duration of acquisition of a measurement as a function of the size of the source diaphragm 3 and of the properties of the sample to be measured. Indeed, a reflection ellipsometer can be used on very reflective materials such as aluminium, or on very little reflective materials such as glass. Now, it is known that the signal-to-noise ratio obtained with a matrix image sensor is often better when the exposure time is chosen so that the maximum signal is close to the saturation, without reaching it, so as to use at best the dynamic of the image sensor 33. The system according to the present disclosure makes it possible to adapt the duration of acquisition of the image sensor 33 in order to obtain a maximum signal on the wavelength band of interest, i.e. a signal closed to the saturation, without reaching this saturation. According to the present disclosure, the duration of acquisition of the image sensor 33 can be adapted without drawback to a wide range as a function of the experimental conditions, for example from 4 ms to 1 s with an acquisition rate from one Hertz to several tens of Hertz to more than 100 Hz or 200 Hz, each spectroscopic measurement extending over a spectral range of several hundreds of nanometres and with a spectral resolution of a few nanometres.

On the contrary, in a temporal polarization modulation ellipsometer, for example based on a rotating optical component, the duration of acquisition of a full measurement is fixed by the modulation rate that imposes to acquire a series of spectral measurements over a modulation period, for example a period of revolution of the rotating optical component.

According to another particular aspect, several source diaphragms 3 having different sizes and/or shapes are arranged. For example, at least two source diaphragms 3 having a surface area ratio of at least 10 between each other are arranged. A switch makes it possible to select the source diaphragm 3 having the suitable size as a function of the desired measurement. On the other hand, a large source diaphragm is used to form a great size spot, for example of 540 μm×250 μm, to acquire rapidly measurements on a sample having no patterns or of heterogeneity smaller than the surface of the spot. On the other hand, a small source diaphragm is used to form a small size spot, for example 50 μm×25 μm, on a sample having small patterns, or to acquire an ellipsometric image with a good spatial resolution. In this case, a maximum light flow arriving on the image sensor is about one hundred times smaller than with the large source diaphragm: it is then interesting to increase the duration of acquisition by a factor 100, in order to use at best the dynamics of the image sensor as a function of the size of the spot used to probe the sample.

An important advantage of the ellipsometer or of the scatterometer according to the present disclosure is to allow the use of light sources whose intensity is not constant over time. The light source 1 can be a conventional lamp emitting a light flow that is unstable over time, fluctuating for example by several percent, or a pulsed source, such as a flash lamp or a pulsed laser. In particular, a source of the supercontinuum type, also called white laser, is herein interesting because it emits a light over a wide spectral range, typically from 390 nm to 1.2 µm, with a very high brightness, at a high repetition rate, for example of 20 kHz, although this type of pulsed source is known to be very little repeatable, in intensity and/or in spectrum shape, from one pulse to the other. Advantageously, when a pulsed source is used, the pulsed source and the detection system are synchronized, so as to be able to control the number of pulses during which the acquisition is made. The ellipsometer according to the present disclosure may be easily and advantageously used with a source that is little stable as a function of time and/or with a pulsed source. On the contrary, a conventional ellipsometer using a temporal polarization modulation operates very badly with an unstable or pulsed source. Indeed, in this case, the evolution of the signal over time cannot be attributed only to the polarization modulation and the signal processing performed is erroneous. According to a particular aspect, the pulsed light source, for example a Xenon flash lamp or a supercontinuum source, is combined with an adjustment of the duration of acquisition so that the number N of light pulses produces an image on the image sensor 33 of the imaging spectrometer 30 whose intensity is just under the saturation in the wavelength range of interest. In other words, the duration of acquisition is adjusted so that, with N pulses, there is no saturation of the image and, with N+1 pulses, there is a saturation of the image.

According to another particular aspect, it is observed that the maximum signal received by the image sensor varies by several decades as a function of the wavelength. This variation depends on the variations as a function of the wavelength of the source intensity, on the optical properties of the sample, on the diffraction grating efficiency and/or on the sensor efficiency. When the duration of acquisition is determined as indicated hereinabove so as to avoid the saturation at the wavelengths at which the signal is the more intense, signal values that are lower by several orders of magnitude that the saturation value at the wavelengths at which the signal is the less intense can be observed. For the low-signal wavelengths, there result sources of error or uncertainty, which are linked for example to the quantification noise of the image sensor. A way to remedy this drawback is to acquire two successive images, corresponding to 2 different values, N1 and N2, of number of pulses of the pulsed light source. N1 is chosen so that the signal does not saturate for any wavelength of interest. N2 is then chosen in a range: 4N1<N2<25N1, for example N2=10N1. The two images acquired with respectively N1 and N2 pulses are then processed separately, as indicated hereinabove, in order to obtain the ellipsometric values of Psi and Delta. Only the values Psi and Delta obtained from the N2-pulse image at the wavelengths for which there is no saturation of the image at these wavelengths are retained. The Psi and Delta spectra at the other wavelengths are completed by those coming from the processing of the image obtained for N1 pulses. Hence, two image captures make it possible to obtain the Psi and Delta values with clearly improved signal conditions thanks to the use of a greater dynamics of the image sensor.

According to an exemplary embodiment, the illumination arm 50 includes a supercontinuum source 1, delivering at the exit of a single-mode optical fibre a source light beam 10 in a spectral range extending form 400 nm to several micrometres. One or several concave mirrors focus the source light beam 10 into a spot 66 on the sample 6. The reflected secondary beam 12 is captured by the illumination arm similar to that described in the first example hereinabove. The supercontinuum source 1 emits a train of 10 pulses for the duration of acquisition of the image sensor. A first image 33a is read by a computer and it is verified that the maximum signal of the signal does not reach the saturation of the image detector 30 but reaches or exceeds 75% of the level of saturation. Then, the supercontinuum source 1 emits a train of 100 pulses and a second image 33b acquired during this train of 100 pulses is read on the computer. The first image 33a and the second image 33b are processed according to the steps detailed hereinabove, in order to obtain the ellipsometric signal over the whole spectral range. The ellipsometric values retained are then those coming from the second image 33b, having a higher signal, except at the wavelengths at which a saturation is observed, and, for these wavelengths, the ellipsometric values retained are those coming from the first image 33a.

According to another particular aspect, an estimator is further extracted, making it possible to quantify the measurement noise level. The ellipsometric measurements are often used in order to adjust the parameters of digital simulation models of materials and/or thin layers. The search for the optical model parameters is generally based on the minimization of the differences between the ellipsometric angles Psi and Delta that are measured and those that come from the model. It is relevant to weight these differences by a parameter that reflects the accuracy of the experimental measurements. A major source of the experiment uncertainties is the shot noise of the detector. In an ellipsometer, the noise on the ellipsometric angles Psi and Delta is of the order of the inverse of the square root of the number of photons measured in the spectral box considered. It is herein meant by "spectral box" the pixels of the six spectral sub-images 41 to 46, assigned to a same wavelength. In the ellipsometer according to the present disclosure, the Stokes vector provides not only the Psi, Delta and depolarization values but the image sensor further provides the total number of photons measured. This total number of photons is easily deduced from the sum of the pixel values at the considered wavelengths, multiplied by the number of photon per digit, this last quantity being a characteristic known by the image sensor 30. A quantity linked to the latter can for example be calculated, such as the inverse of the square root of the number of photons detected in the spectral box divided by two, which provides directly an estimator of the quantification noise of the ellipsometric angles Psi and Delta if these latter are expressed in radians. Other quantities indicative of the signal-to-noise ratio can be calculated from the sum of the pixel values of a sub-area of the image sensor 30.

The advantages of using a supercontinuum source having a very high brightness over a wide spectral range, for example from 300 nm to 1.2 µm, have already be mentioned hereinabove. The radiation emitted by a supercontinuum source exits from an optical fibre whose core diameter is generally lower than 5 µm. The incident light beam can be focused into a very small spot on the sample: for example, $W_{e,s}=10$ µm and $W_{e,p}=20$ µm. The surface area of the source being small, its 6 images in the plane of the entrance slit 31 of the imaging spectrometer are also of small size and very spatially separated: for example, $W_{f,s}$ and $W_{f,p}$ being of about 5 μm, the different spots being separated by 450 μm in the direction of the length of the slit 31. This spatial separation of the 6 images on the entrance slit makes it possible to obtain a very good spectral resolution because, for an imaging spectrometer as for a conventional spectrometer, the spectral resolution is all the better since the width $W_{f,p}$ of the slit (real or virtual) at the spectrometer entrance is small. It is then observed on the image sensor 33 of the image spectrometer 30, six trails corresponding to the spectral spreading of each polarization, whose width Wi,s is very small compared to the spacing between two adjacent areas, for example 41 and 42 (see FIG. 8). According to a variant, in combination with a source of small extent such as a supercontinuum source, a cylindrical lens, converging or diverging, is added in the detection arm 60 between the sample 6 and the entrance slit 31 of the imaging spectrometer, and preferably in the space in which the beams are collimated. The cylindric lens is directed so as to spatially scatter the 6 images in the direction of the entrance slit 31 while avoiding that the 6 images overlap each other. Hence, the intensity coming from the supercontinuum source is spread over a greater number of pixels of the image sensor 33, without impairing the spectral resolution. This variant makes it possible to sense a higher quantity of light during each acquisition by the image sensor without reaching the saturation of the image sensor.

According to another particular aspect, the ellipsometer or scatterometer further includes a table for moving the sample-holder. The moving table generally includes two translation axes transverse to the normal to the sample. Such a moving table allows the acquisition of ellipsometric spectra at different points of the sample.

A map of a sample, such as for example a semiconductor plate, is hence obtained. In a polarization-modulation ellipsometer, it is essential to stop the displacement to acquire a complete measurement, because the duration of a measurement is of at least half a modulation period. However, the point-by-point acquisition is time-consuming due to the repeated stop-and-go movements of the moving table. It is desirable to obtain more rapidly a map of the sample. An instantaneous ellipsometer or scatterometer according to the present disclosure makes it possible to combine the use of a short-pulse pulsed light source with a moving table moving continuously. It is herein meant by "short pulse" a pulse that short enough so that the displacement is negligible for the pulse duration. That way, it is not necessary to stop the displacement of the sample-holder at each measurement, because an instantaneous ellipsometric measurement is acquired during a single pulse (or a few pulses). This mode of acquisition makes it possible to acquire a series of measurements on the fly, at each source pulse, without having to stop the moving table to punctually make a measurement. The acquisition rate of the measurements is determined by the repetition rate of the source and/or the reading rate of the image detector 33 of the imaging spectrometer 30 that is to be synchronized. With a CMOS camera, a reading rate of 50 Hz or even higher than 100 Hz can be reached. A xenon flash lap makes it possible to produce a significant quantity of light, on pulses of a few nanoseconds, at a rate of the same order of magnitude or higher. A supercontinuum source has a repetition rate that may reach 20 kHz. That way, a spectroscopic ellipsometer according to the present disclosure makes it possible to obtain a map including hundreds of points in a few seconds.

On the contrary, the conventional ellipsometers based on a temporal polarization modulation require that the acquisition is made with the moving table stopped during at least one modulation period. Now, the modulation rate of a rotating optical component is generally of the order of a few Hz to about 20 Hz maximum, which is far slower than the maximum acquisition rate of an ellipsometer according to the present disclosure operating with a short-pulse pulsed source. Moreover, the necessity to stop the table than to put it back in motion limits the displacement rate to a few Hz. It ensues therefrom that a temporal polarization modulation ellipsometer makes it possible to obtain a map with only a maximum rate of the order of about ten Hz, i.e. at least one order of magnitude lower than the maximum rate of an ellipsometer according to the present disclosure, operating with a short-pulse pulsed source in combination with a continuous motion of the moving table.

According to a variant, illustrated in FIG. 10, the ellipsometer or scatterometer further includes an auxiliary imaging system. The auxiliary imaging system includes an auxiliary light source 70 emitting a small spectral-width light beam 75, for example of the LED type, associated with an auxiliary imaging mask 71 whose image is projected to the sample 6, on a surface area of the order of 1.5 mm×4 mm, and an auxiliary camera 78 provided with a lens 77, arranged on the optical path after the optical polarization-splitter device 26. As illustrated in FIG. 10, a reflective optical component 73, arranged between the source diaphragm 3 and the optical focusing system 4, makes it possible to inject the auxiliary light beam 75 on the incident optical axis 9 towards the sample. Another reflective optical component 76 makes it possible to reflect the reflected auxiliary light beam 79 on the secondary optical axis 19 towards the auxiliary camera 78. The auxiliary camera 78 is optically conjugated with the 6 images coming from the auxiliary imaging mask 71, 6 images that do not overlap or at most partially. The field that can be imaged on the sample can extend from a few mm² to a few tens of mm².

Due to the segmented lenses and the Wollaston prism described hereinabove, the auxiliary camera 78 receives 6 images 341, . . . , 346 of the area illuminated by the auxiliary illuminator, as illustrated for example in FIG. 11. When the illuminated area on the sample includes patterns that have different ellipsometric properties at the wavelength of the auxiliary light source 70, the optical answers of these patterns appear differently on each of the 6 images, due to the fact that these 6 images correspond to different polarizations. To extract therefrom an image of the ellipsometric parameters Psi and Delta, it is just necessary, for each set of points 361, 362, 363, 364, 365, 366 having the same coordinates in each image, to process the received intensity as indicated p14, line 20 and following, in order to determine at this same point the value of Psi, and the value of Delta. Two images are hence obtained, the image 340 representing PSI, the other image 349 representing DELTA, at the wavelength of the auxiliary light source 70 on the illuminated area of the sample 6. It has hence been shown a method for making ellipsometry imaging at one wavelength. Using an auxiliary source of the RGB diode type, an ellipsometric image of the sample can be successively acquired at three different wavelengths.

Another use of an auxiliary imaging system is intended to the visualization of the position of the spot of the spectroscopic ellipsometer on the sample. Contrary to the above example for which the polarized incident light beam 11 coming from the main light source 1 had been turned off or blocked, in this use, the auxiliary camera 78 receives simultaneously the image of the main light source 1 and of the auxiliary light source 70. The far higher intensity of the spot of the main ellipsometer 371 makes it possible to identify the position thereof without ambiguity. Hence, FIG. 12 illustrates an example making it possible to visualize at a time the spot of the ellipsometric beam 371 superimposed to the image 341 of an greater area of the sample 6. This image 341 of an greater area of the sample may be one of the 6 images 341, . . . , 346, or also the image 340 in PSI and/or the image 349 in DELTA.

The interest of visualizing a portion of the sample and the position of the spot on the sample on an ellipsometer, and its implementation on a modulation ellipsometer, was already known, but not its implementation in an instantaneous ellipsometer, neither the way to obtain it.

According to a particular aspect of this variant, the plane of the sensor of the auxiliary camera is inclined so as to fulfil the Scheimpflug conditions. More precisely, the angle of inclination i3 of the plane of the sensor of the auxiliary camera with respect to the optical axis is linked to the angle of incidence ion the sample, at the focal length F1 of the segmented lens 22, and at the focal length F3 of the lens 77 of the auxiliary camera 78, by the relation:

$$tg(i_3) = \frac{F_3}{F_1} tg(i)$$

The auxiliary imaging mask 71 is also inclined, its normal forming with the incident beam an angle $i_0$ expressed as a function of the previous parameters, and of the magnification ratio G of the optical illumination system 4, by the relation:

$$tg(i_0) = 1/Gtg(i)$$

In a particularly advantageous manner, the processing for obtaining Psi and Delta for each of the spectropolarimetric paths is applied to the wavelength of the auxiliary lighting, at each point of the sample present in the 6 images 341 . . . 346 formed simultaneously on the auxiliary camera 78, in order to obtain a map of the Psi and Delta of the sample observed without displacement.

In an exemplary embodiment, an auxiliary light source 70, comprising a diode emitting a light beam at 640 nm, over a spectral width of about 10 nm, is added to the ellipsometer described in the first example. It is moreover supposed that this ellipsometer operates with an angle of incidence of i=70°. The auxiliary light beam emitted by this diode is imaged on an auxiliary imaging mask 71 of size Wa,s=0.75 and Wa,p=2 mm, itself reimaged on the sample 6 by a magnification optical system 2. The normal to this auxiliary imaging mask 71 is inclined by an angle $i_0$ of 53 degrees with respect to the optical axis of the auxiliary light beam 75.

A semi-reflective blade 73 allows combining the beams coming from two sources 1 and 70, the two sources being at a distance of 100 mm from the focusing lens 4 of the illumination arm 50.

The detection arm 60 is similar to that of Example 1, and further includes a separating plate 76 placed after the Wollaston prism 26. The lens 77 of the auxiliary camera 78 of focal length F3=35 mm focuses the beam fetched on the sensor of the auxiliary camera 78. Advantageously, as detailed hereinabove, the normal to the plane of the sensor of the auxiliary camera 78 forms an angle $i_3$ with the optical axis of 43 degrees according to the Scheimpflug conditions.

The invention claimed is:

1. An ellipsometer (100) comprising:
   a light source (1) adapted to generate a source light beam (10);
   a polarizer (5) adapted to receive the source light beam (10) and to form a polarized incident light beam (11);
   an illumination optical system (2, 4) adapted to direct the polarized incident light beam (11) towards a sample (6) following an incident optical axis (9) in a plane of incidence (8);
   an optical wavefront-division beam splitter (20) arranged so as to receive a secondary light beam (12) formed by reflection or transmission of the polarized incident light beam (11) on the sample at a determined angle of incidence, the secondary light beam (12) propagating along a secondary optical axis (19) in the plane of incidence (8), the optical wavefront-division beam splitter (20) being directed so as to form three collimated split beams (13, 14, 15) propagating along three distinct optical axes (16, 17, 18) angularly separated in a plane transverse to the plane of incidence (8); and
   an optical polarization-changing device (25) adapted to receive the three collimated split beams (13, 14, 15) and to form three beams polarized according to three distinct states of polarization;
   an optical polarization-splitter device (26) arranged and directed so as to receive the three beams polarized according to three distinct states of polarization and to form six separated beams (131, 132, 133, 134, 135, 136) propagating along six optical axes angularly separated in the plane transverse to the plane of incidence;
   a detection system adapted to detect the six separated beams (131, 132, 133, 134, 135, 136) and a processing system adapted to deduce therefrom an ellipsometry measurement.

2. The ellipsometer according to claim 1, wherein the ellipsometer is monochromatic.

3. The ellipsometer according to claim 1, wherein the detection system comprises at least one spectrometer adapted to detect the six separated beams (131, 132, 133, 134, 135, 136).

4. The ellipsometer according to claim 3, comprising:
   an optical focusing system (27) arranged to receive the six separated beams (131, 132, 133, 134, 135, 136) and to form six images (141, 142, 143, 144, 145, 146) aligned with each other and spatially separated from each other;
   and wherein said at least one spectrometer comprises an imaging spectrometer (30) comprising an entrance slit (31) elongated along one direction and arranged so as to receive simultaneously the six images (141, 142, 143, 144, 145, 146), the imaging spectrometer (30) being adapted to spectrally disperse the six images (141, 142, 143, 144, 145, 146), and to form simultaneously six spectral sub-images (41, 42, 43, 44, 45, 46) spatially-separated on an image detector (33);
   the image detector (33) being adapted to acquire an image of the six spectral sub-images (41, 42, 43, 44, 45, 46); and
   the processing system being adapted to process the image of the six spectral sub-images and to deduce therefrom a spectroscopic ellipsometry measurement.

5. The ellipsometer (100) according to claim 4, wherein the light source (1) includes a halogen lamp, a xenon flash lamp, a supercontinuum laser source and/or a fibre optic laser and/or a pulse source, and wherein the light source (1) includes a halogen lamp, a xenon flash lamp, a supercontinuum laser source and/or a fibre optic laser and/or a pulse source, and wherein the light source (1) includes a supercontinuum laser source and further includes a cylindrical lens arranged on the optical path of the secondary beam upstream from the entrance slit (31) of the imaging spectrometer (30), the cylindrical lens being adapted and directed so as to enlarge the six images transversally to the elongated direction of the entrance slit (31).

6. The ellipsometer (100) according to claim 4, wherein the light source (1) is adapted to generate a first series of N1 light pulses, where N1 is a natural integer, the image detector (33) being adapted to acquire a first image of the six spectral sub-images of the first series of N1 light pulses without saturation of the image detector (33), the light source (1) being adapted to generate a second series of N2 light pulses, where N2 is a natural integer, N2 being comprised between N1+1 and 25.N1, the image detector (33) being adapted to acquire a second image of the second series of N2 light pulses with saturation of the image detector (33) on a first portion of the six spectral sub-images and without saturation of the image detector (33) on a second portion of the six spectral sub-images, and wherein the processing system is adapted to combine the first portion of the six spectral sub-images of the first image with the second portion of the six spectral sub-images of the second image to deduce therefrom the spectroscopic ellipsometry measurement.

7. The ellipsometer (100) according to claim 4, wherein at least two spectral sub-images (41, 42, 43, 44, 45, 46) are spatially separated from each other by an intermediate area (51, 52, 53, 54, 55) and wherein the image processing system is adapted to measure a spurious light intensity in the intermediate area (51, 52, 53, 54, 55) and to subtract said spurious light intensity from at least a portion of the image of the six spectral sub-images.

8. The ellipsometer according to claim 1, wherein the optical illumination system (2, 4) is adapted to focus the polarized incident light beam (11) on the sample (6) and wherein the optical wavefront-division beam splitter includes a segmented lens (22) including three lens segments (221, 222, 223) having a same focal length and optical axes (225, 226, 227) parallel to each other and spatially separated from each other, each lens segment (221, 222, 223) having an object focal point (Fa, Fb, Fc), the thee lens segments (221, 222, 223) being assembled so that said three object focal points (Fa, Fb, Fc) are aligned on the sample (6) transversally to the plane of incidence, each lens segment (221, 222, 223) being arranged so as to receive a distinct portion of the secondary beam (12) and to form a collimated split beam (13, 14, 15), the three lens segments (221, 222, 223) being assembled so that said three split beams (13, 14, 15) propagate along the three distinct optical axes.

9. The ellipsometer (100) according to claim 1, wherein the optical illumination system (2, 4) is adapted to collimate the polarized incident light beam (11) on the sample (6) and wherein the optical wavefront-division beam splitter includes at least two prisms (231, 232, 233) having their edges arranged parallel to the plane of incidence (8), each prism (231, 232, 233) being arranged so as to receive a distinct portion of the secondary beam (12) and to form a collimated split beam (13, 14, 15) propagating along an optical axis angularly deviated with respect to the secondary optical axis (19), the at least two prisms (231, 232) being directed and assembled so that said three collimated split beams (13, 14, 15) propagate along the three distinct optical axes.

10. The ellipsometer (100) according to claim 1, wherein the optical wavefront-division beam splitter further includes a mask (21) including three spatially-separated apertures (211, 212, 213).

11. The ellipsometer (100) according to claim 1, wherein the optical polarization-changing device (25) includes at least two wave plates, each wave plate having a distinct retardance, a wave plate being arranged on one of the three split beams (13, 14, 15) and another wave plate being arranged on another one of the three split beams (13, 14, 15).

12. The ellipsometer (100) according to claim 1, wherein the optical polarization-splitter device (26) includes a Wollaston prism, a Rochon prism, a Sénarmont prism or a diffractive wave plate.

13. The ellipsometer (100) according to claim 1, wherein the optical wavefront-division beam splitter (20) is adapted to angularly separate the three split beams (13, 14, 15) by an angle ALPHA between adjacent split beams (13, 14, 15) and wherein the optical polarization-splitter device (26) is adapted to angularly separate the six separated beams (131, 132, 133, 134, 135, 136) by an angle BETA between adjacent separated beams (131, 132, 133, 134, 135, 136), the angle BETA being comprised between 0.6*ALPHA/2 and 1.5*ALPHA/2.

14. The ellipsometer (100) according to claim 1, wherein the light source (1) includes a halogen lamp, a xenon flash lamp, a supercontinuum laser source and/or a fibre optic laser and/or a pulse source.

15. The ellipsometer (100) according to claim 1, including a first source diaphragm (3), the optical illumination system (2, 4) being adapted to form a first image of the first source diaphragm (3) on the sample (6), and/or including a second source diaphragm, the optical illumination system (2, 4) being adapted to form a second image of the second source diaphragm on the sample (6), the surface area ratio between the first source diaphragm (3) and the second source diaphragm being higher than or equal to 10.

16. The ellipsometer (100) according to claim 1, further including a system for moving a sample-holder, wherein the light source (1) is adapted to generate a series of light pulses, the detection system being adapted to acquire a series of acquisitions of the six separated beams corresponding to the series of light pulses during a displacement of the sample-holder, and wherein the processing system is adapted to process the series of acquisitions and to deduce therefrom a series of ellipsometry measurements as a function of the sample-holder displacement.

17. The ellipsometer (100) according to claim 1, further including an auxiliary light source (70) adapted to illuminate a surface of the sample and/or an auxiliary camera (78) adapted to acquire at least one image of the sample.

18. An ellipsometry measurement method comprising the following steps:
generating a polarized incident light beam (11);
directing the polarized incident light beam (11) towards a sample (6) along an incident optical axis (9) in a plane of incidence (8);
receiving a secondary beam (12) formed by reflection or transmission of the polarized incident light beam (11) on the sample (6) at a determined angle of incidence, the secondary beam (12) propagating along a secondary optical axis (19) in the incidence plane (8);
optically splitting the secondary beam by wavefront division, so as to form three collimated split beams (13, 14, 15) propagating along three distinct optical axes, the three distinct optical axes being angularly separated in a plane transverse to the plane of incidence;
changing the polarization of at least two of the three collimated split beams (13, 14, 15) so as to form three beams polarized according to three distinct states of polarization;

polarization-splitting the three polarized beams so as to form six separated beams (131, 132, 133, 134, 135, 136) propagating along six optical axes angularly separated in a plane transverse to the plane of incidence (8);

detecting the six separated beams (131, 132, 133, 134, 135, 136) to deduce therefrom an ellipsometry measurement.

19. A scatterometer (100) comprising:

a light source (1) adapted to generate a source light beam (10);

a polarizer (5) adapted to receive the source light beam (10) and to form a polarized incident light beam (11), an optical illumination system (2, 4) adapted to direct the polarized incident light beam (11) towards a sample (6) along an incident optical axis (9) in a plane of incidence (8);

an optical wavefront-division beam splitter (20) arranged so as to receive a secondary light beam (12) formed by diffraction of the polarized incident light beam (11) on the sample at a determined angle of incidence, the secondary light beam (12) propagating along a secondary optical axis (19) in the plane of incidence (8), the optical wavefront-division beam splitter (20) being directed so as to form three collimated split beams (13, 14, 15) propagating along three distinct optical axes (16, 17, 18) angularly separated in a plane transverse to the plane of incidence (8); and an optical polarization-changing device (25) adapted to receive the three collimated split beams (13, 14, 15) and to form three beams polarized according to three distinct states of polarization;

an optical polarization-splitter device (26) arranged and directed so as to receive the three beams polarized according to three distinct states of polarization and to form six separated beams (131, 132, 133, 134, 135, 136) propagating along six angularly separated optical axes in the plane transverse to the plane of incidence; and a detection system adapted to detect the six separated beams (131, 132, 133, 134, 135, 136) and a processing system to extract therefrom a scatterometry measurement.

20. The scatterometer (100) according to claim 19, comprising:

an optical focusing system (27) arranged so as to receive the six separated beams (131, 132, 133, 134, 135, 136) and to form six aligned and spatially separated images (141, 142, 143, 144, 145, 146);

an imaging spectrometer (30) comprising an entrance slit (31) elongated along one direction and arranged so as to receive simultaneously the six images (141, 142, 143, 144, 145, 146), the imaging spectrometer (30) being adapted to spectrally scatter the six images (141, 142, 143, 144, 145, 146) and to form simultaneously six spectral sub-images (41, 42, 43, 44, 45, 46) spatially separated on an image detector (33);

the image detector (33) being adapted to acquire an image of the six spectral sub-images (41, 42, 43, 44, 45, 46); and the processing system being adapted to process the image of the six spectral sub-images and to deduce therefrom a spectroscopic scatterometry measurement.

\* \* \* \* \*